United States Patent [19]

Berglund

[11] Patent Number: 4,647,855
[45] Date of Patent: Mar. 3, 1987

[54] PNEUMETIC SURFACE FOLLOWER WITH POSITION RESTORING FORCE

[76] Inventor: Per R. Berglund, Musserongangen 18, S-135 34, Tyresö, Sweden

[21] Appl. No.: 653,008

[22] PCT Filed: Jan. 11, 1984

[86] PCT No.: PCT/SE84/00004
 § 371 Date: Sep. 11, 1984
 § 102(e) Date: Sep. 11, 1984

[87] PCT Pub. No.: WO84/02772
 PCT Pub. Date: Jul. 19, 1984

[30] Foreign Application Priority Data

Jan. 12, 1983 [SE] Sweden .............................. 8300131

[51] Int. Cl.$^4$ ...................... G01B 7/10; G01B 13/04; G01N 27/72
[52] U.S. Cl. ................................. 324/226; 324/229; 73/37.7
[58] Field of Search .............................. 324/229–231; 73/37.5–37.9

[56] References Cited

U.S. PATENT DOCUMENTS 4,325,249 4/1982 Berglund .............................. 73/37.6
4,450,404 5/1984 Williams et al. ..................... 324/229

Primary Examiner—Ernest F. Karlsen
Assistant Examiner—Walter E. Snow
Attorney, Agent, or Firm—Pollock, Vande Sande & Priddy

[57] ABSTRACT

Apparatus for measuring thickness, two light measuring heads (2, 3) being mounted by air bearings in housings on either side of the web (1). The measuring heads are provided with specially implemented nozzles blowing against the surface and maintaining a constant distance of 60–100 m to the respective paper surfaces. The thickness is measured by the distance between the nozzles being measured via an electrical measuring probe (13) in one, and a means (13') sensed by the measuring probe. By the special implementation of the nozzles (12, 12') and by their being pneumatically pressing (via 11) against the surfaces, great accuracy (better than 0.5 m) is achieved even if the position of the paper is altered, rapidity also being considerable. The time to indication for a thickness alternation of about 100μ is about 0.5 msec.

4 Claims, 12 Drawing Figures

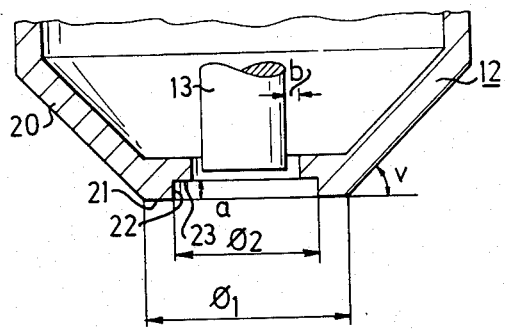
FIG.2
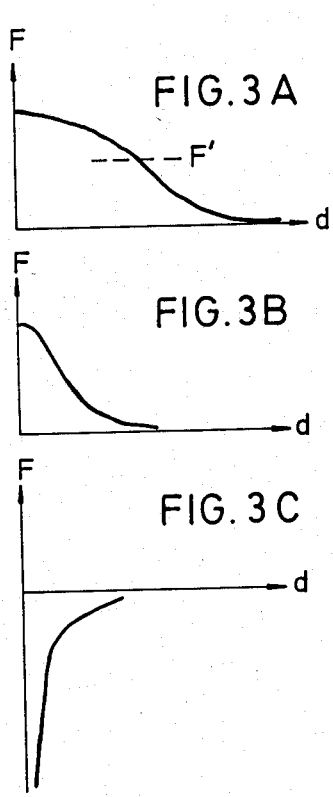
FIG.3A
FIG.3B
FIG.3C
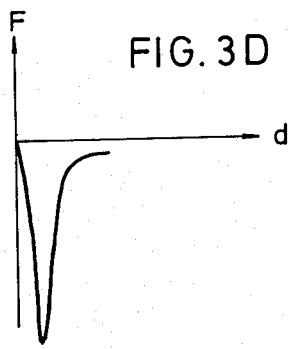
FIG.3D
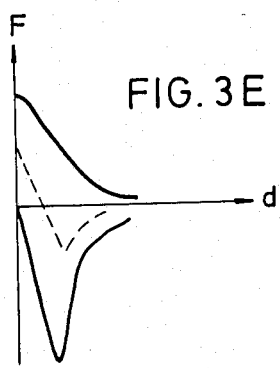
FIG.3E

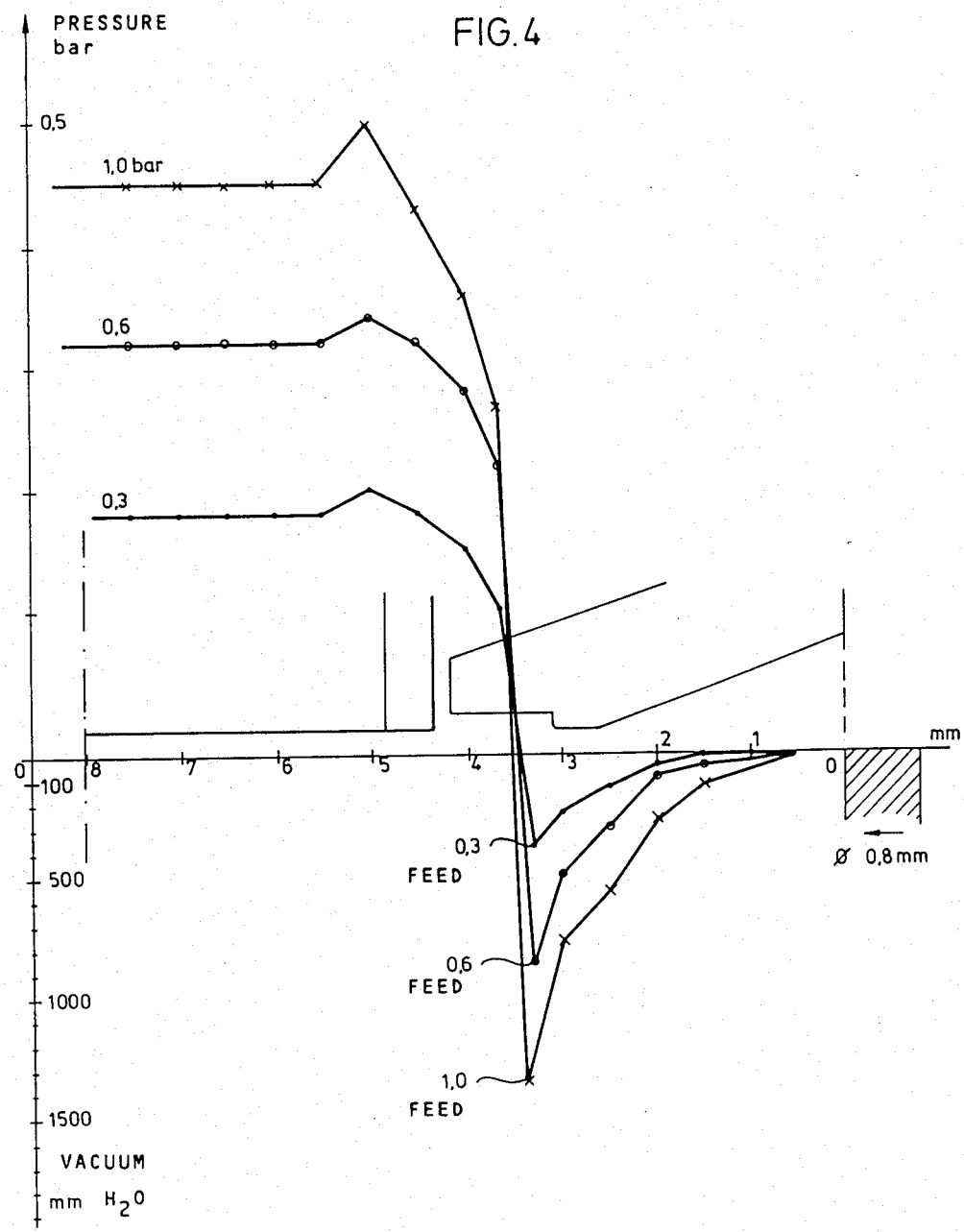

PNEUMATIC SURFACE FOLLOWER WITH POSITION RESTORING FORCE

FIELD OF THE INVENTION

The invention relates to apparatus for measuring the thickness of a moving web, there being two axially opposite measuring heads, with the web insertable between them, the measuring head being axially movable, supplied with a pressurized fluid and provided with ejection means for urging the pressurized fluid in a direction towards the web for maintaining a constant distance between the respective measuring head and the web, electrical transducer means being disposed in the heads for generating signals in response to the distance between the heads and thereby to the thickness of the web.

BACKGROUND OF THE INVENTION

Apparatus functioning according to such a principle is illustrated in U.S. Pat. No. 4,107,606. This publication only illustrates the said principle very schematically, and is more specifically directed towards a construction for electrical distance measurement between two measuring heads. How these are to be designed and implemented is not described in detail particularly as to the maintenance of distance provided pneumatically.

Another apparatus of the same kind is disclosed in U.S. Pat. No. 3,528,002, although what is described in detail really consists of a fixed measuring head, from which the web is caused to maintain a constant distance while only the opposing head is movable. The distance maintenance is described as taking place by compressed air being caused to emanate through a porous plug, for generating an air cushion and a lifting force counteracted by a constant counterforce, which is illustrated as being generated by a relatively heavy mass. It is obvious that this is a great disadvantage if a rapidly-acting thickness meter is desired, since large mass results in large inertia.

Another prior art method for measuring thickness utilizes a single movable transducer, the position of the web being maintained fixed against an underlying plate, e.g., a suction plate, while the movable transducer is kept by means of a pneumatic distance maintenance at a constant distance from the other side of the web. Such a device is known from U.S. Pat. No. 3,818,327, the distance between the suction plate and transducer being measured electromagnetically. A similar device is known from U.S. Pat. No. 3,617,872. With regard to the movable transducer, it is disclosed in both cases that an air cushion generated by compressed air is used together with a relatively heavy structure, the gravitational force of which counteracts the air pressure.

A substantially lighter structure for a transducer having pneumatic distance maintenance is known from applicant's own Swedish Published Specification No. 7900795-1. In this structure there is a light, movable and hollow measuring means, which is carried in air bearings, is axially movable in a holder, has at one end an air-blowing nozzle and at the other end a disc arranged with annular clearance in an outwardly open cylindrical chamber, the portion of the cylindrical chamber partially closed off by the disc being supplied with compressed air such that a counterforce acts on the measuring means for urging it in a direction away from the measured surface. This structure functions relatively well, but it would be desirable to make it faster in assuming its state of equilibrium, and to reduce the distance between nozzle and measuring surface.

OBJECT OF THE INVENTION

One object of the present invention is to provide an apparatus for measuring the thickness of a moving web of the kind described above, the apparatus having the ability of reacting very quickly, both measuring heads being able to follow the web, one on either side thereof, even if the web itself oscillates at right angles to its plane. It is then necessary to have a large directional force for keeping the constant distance between the measuring head and web on either side of the web, i.e., for an incident change in the distance between the web surface and the measuring head, there must occur a large corrective force between the web surface and the measuring head, and the measuring head must be extremely light. The directional force should thereby be large in relation to the size of the moving mass.

The invention is based on the recognition that, apart from an "air cushion force" at an air nozzle, i.e., a force occurring in a space between the web and the jet, there is also a relatively large "suction" force, such as occurs due to the Bernoulli effect, where the fluid exits the space between the nozzle and web in a laminar flow. This suction force should be smaller than the air cushion force, the difference being compensated with the aid of fluid pressure on the measuring head acting as a piston in an outward direction. Furthermore, the pneumatic forces should be adjusted such that the distance is maintained constant and that a change in the distance results in a large readjusting force.

The above-mentioned and other objects and advantages are achieved in accordance with the invention in that by implementing an apparatus of the kind discussed in the introduction such that the measuring heads each includes a housing with two radially acting air bearings, in which is mounted a hollow stem, to the first end of which the respective ejection means is attached; means for supplying pressurized fluid to the interior of the stem; a closed first chamber which is pressurizable and in which the second opposite end of the stem is insertable; and in that the respective ejecting means comprises a space surrounded by an edge and recessed in relation to the edge, the space obtaining pressurized fluid from the pressurized fluid source via a constriction, and having a cross section at right angles to the axial direction having a larger area than the cross-sectional area of the stem, the fluid pressure in the closed first chamber acting in an outwardly urging direction.

A particular advantage of this arrangement is that the movable devices assume their stable positions automatically upon pressurization.

BRIEF DESCRIPTION OF THE DRAWINGS

The invention will now be described in detail in conjunction with several embodiments shown in the accompanying drawings.

FIG. 2 is a section view illustrating a detail of a nozzle.

FIGS. 3A–3E are diagrams intended to explain the function of the invention.

FIG. 4 illustrates pressure curves taken during measurement.

DETAILED DESCRIPTION

Figure 1:
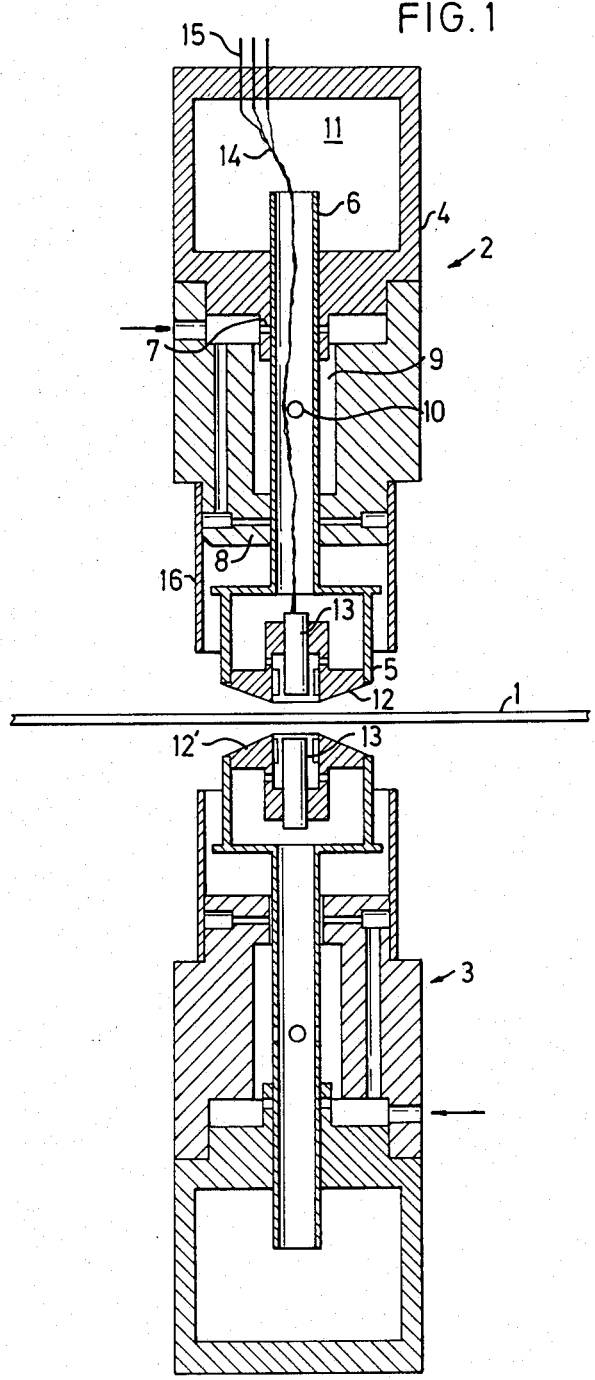
FIG. 1 illustrates an apparatus in accordance with the invention.

An embodiment of the invention is depicted in FIG. 1, and has two measuring devices 2 and 3 arranged above and below, respectively, a web 1 which may be moving, e.g., the paper web in a papermaking machine. The measuring devices may be movable in the direction transverse of the web, e.g., as illustrated in U.S. Pat. No. 3,528,002.

Since both measuring devices are rather similar, only the upper measuring device 2 will now be described. In a housing 4 there is a rotationally symmetrical measuring head 5. This measuring head has a stem 6 in the form of a thin aluminum tube, and a nozzle portion 12 facing towards the web 1. The stem 6 is movable in two air bearings 7 and 8, fed with compressed air via the housing 4. Between the bearings 7 and 8 there is a chamber 9 which is also supplied with compressed air. In the portion of the stem 6 passing through the chamber 9 there are a plurality of holes, of which only the hole 10 is illustrated.

The end of the stem 6 facing away from the nozzle 12 thrusts into a closed chamber 11 and is open. The nozzle 12 obtains compressed air from the interior of the stem 6.

In the nozzle 12 there is an electromagnetic sensor 13, for sensing the distance to another sensing means 13' situated in a corresponding manner in the substantially similar, lower unit 3. With the aid of flexible wires 14 in the stem 6 the upper sensor 13 is connected via a lead-through 15 to an electromagnetic measuring circuit.

In accordance with the functional principle of the invention, the nozzle 12 is to be kept at a small, specific distance from the surface of the web 1, and in such a manner that if the distance is changed, a considerable force will return the jet to the specified distance.

The design of the nozzle has great importance, and is shown in detail in FIG. 2.

As will be seen, the nozzle has the general form of a truncated cone 20, forming at the truncated end a slightly rounded annular surface 21, limited along its inner edge by the wall 22 of a recess with a bottom plane 23. In this plane is situated the electromagnetic sensor means 13. Where the latter penetrates towards the plane 23 there is formed a narrow annular gap with the width b. The depth of the recessed plane 23 is denoted by a. The wall 22 forms an annular surface having a diameter $\phi_2$, and the junction between truncation and cone 20 takes place along a circle having the radius /diam./$\phi_1$.

In an embodiment which has functioned well, the outer diameter of the stem 6 was 7 mm, its inner diameter 5 mm, $\phi_1$ was 10 mm, $\phi_2$ was 9 mm, the depth a was 0.2 mm and the gap b 0.20 mm.

It will be appreciated that the forces acting on the movable nozzle portion are gravity, a pneumatic force from compressed air, pressing the stem 6 outward of the chamber 11, the air cushion pressure in the space between the web 1 and the forward end of the nozzle, and the suction force occurring when the air departs laterally in the gap between the surfaces 21 and 20 and the web 1. The latter is, as is know from Bernoulli's law, proportional to the square of the air velocity in the gap.

The air supply was stabilized with the aid of a reduction valve of good quality (e.g., Nordgren's precision regulator) so that a pressure of 1 bar was supplied to the apparatus. The nozzles then adjusted themselves such as to be at a distance of about 80 μm from the surfaces. Sensitivity to variations in supplied pressure was insignificant. A deviation in distance amounting to 3 μm has been measured for an alternation of 0.1 bar, i.e., 10% of the pressure upwards or downwards. In view of the fact that a regulator set at 1 bar output pressure will maintain the pressure within about 0.3% for an alteration of the input pressure of between 5 and 7 bar, this source of error can be ignored. Well-reproducible measurement of the thickness could then be made at better than 0.5 μm, with the further advantage that within wide limits (±10 mm) the axial position of the paper does not significantly affect the result. This is very advantageous in measurement during the manufacture of paper webs. It may be noted that the velocity of the paper web only insignificantly and hardly measurably affects thickness measurement, even for high speeds. The forces against the paper from both transducers tend to cancel out.

Previous tolerance requirements in the paper industry have been at ±5 μm in the manufacture of newspaper with an average thickness of 60 μm; this may be greatly improved with the aid of the present invention.

It has been found that the apparatus according to FIG. 1 is rather insensitive to deviations from the vertical, and more or less unresponsive to such deviations within 0°–45°, although the paper must of course be trained at a corresponding angle. The reproducibility at turning the air on and off corresponds to 0.15 μm. (If the paper slopes by a couple of degrees in relation to a normal plane, no difference is experienced in the measuring value, probably because the air bearings provide some compensation.)

The proximeter 13,13' used was of a standard type obtained from TSI (Transducer Systems Inc.), with the designation: Proximity transducer type XPTO15-022-250-750A.

The apparatus has been tried with success in a papermill in conjunction with a paper web having a velocity of 900 m/min.

The rapidity of answer is considerable. A "step" of 60 μm in the form of a piece of adhesive tape on a paper 100 μm thick resulted in a 100% answer to the step in 6 msec, and it is presumed that a large part of the delay is due to the electronics. In a corresponding case in an experiment with only one transducer, a rise time (10–90% of full indication) of approximately 0.5 ms was measured.

It has been found that if such a step edge is successively inserted in the gap between the two nozzles according to FIG. 1, full indication for the thickness change is achieved when approximately 50% of the measuring surface is covered by the thicker part of the web (the measuring surface being reckoned as a circular surface with a diameter of 10 mm).

Consumption of compressed air is approximately 35–40 normal liters per minute, resulting in a cost for compressed air in full operation of about $300.00 per year. Prior art instruments working with single-sided sensing consume about 10 times as much compressed air.

Although there is no complete theory available, the following discussion is an attempt to explain why the invention works so well.

In prior art instruments, it has been usual to build essentially on the air cushion principle. Air is ejected through several orifices into the intermediate space between a moving surface and a stationary one, the moving surface being loaded with a constant force. This force must be less than the applied pressure times the surface, as otherwise the surfaces would come into mutual contact. For an increased spacing, the air cushion force decreases, and there is thus obtained in principle a stable spacing with a somewhat smaller counterforce. Increased spacing gives less air-cushioning force, reduced spacing a larger air-cushioning force, and a restoration force is obtained which favors restoration of the original state. The graph for force-distance is schematically illustrated by FIG. 3A.

A steeper curve may be obtained if the compressed air is supplied via a suitable constriction, since the maximum force (for direct contact) will remain unaltered, while the pressure is heavily reduced when air consumption increases. This is schematically illustrated by FIG. 3B. However, there is also a suction force concerned with the present invention. This suction force is theoretically proportional to the square of the air velocity in the air gap. For a constant quantity of air per time unit, the suction force will then increase rapidly when the distance d decreases, and a suction force as illustrated in FIG. 3C could be obtained. Such a force curve is however such that no stability can be achieved unless the counterforce, which is to balance it, is directed for urging the nozzle away from the paper. A further difficulty with such an operational principle is that the air quantity per time unit must be kept constant, and not the pressure. Maintaining a constant pressure at the nozzle is already difficult in view of constrictions in the system. In more practical cases it is difficult to allow the pressure to increase for reduced distance, and therefore in the normal case there is a force curve for the suction force which moves toward zero when the distance moves toward zero, and a curve having a change of direction according to FIG. 3D is obtained.

It is therefore presumed that the function of the invention corresponds to a combination of the curves in FIGS. 3B and 3D, both the suction force and air cushioning force being changed in the same direction for a change in the distance, and that the force counteracting the variable forces, and corresponding to the air pressure on the cross section of the stem 6, urges the nozzle towards the web.

FIG. 4 shows the measured static pressure under a measuring head for three different applied pressures. The graphs do no appear to conflict with the proposed explanation. They are recorded with a movable orifice with a diameter of 0.8 mm, made in a base plate and connected to a pressure gauge.

Figure 5:
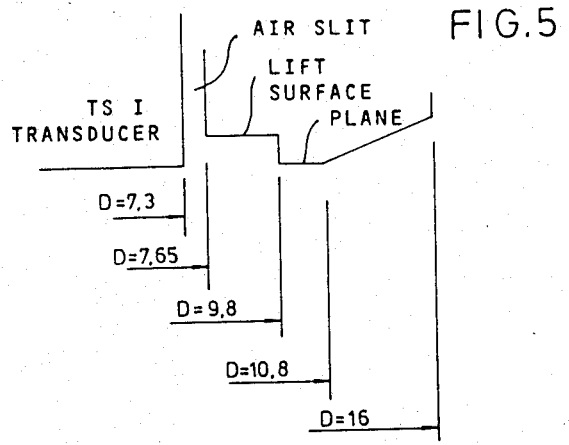
FIG. 5 is a dimensional sketch of a nozzle.

The correctness of this reasoning and the importance of the constrictions are supported by the fact that the size of the gap b according to FIG. 2 has proven critical for stable operation. For example, if the gap b in FIG. 2 is made 0.35 mm, a stable if somewhat large distance is obtained only if the supplied pressure is heavily increased, rather good stability is obtained for the width 0.25 mm, and for 0.20 mm there is obtained quite excellent operation without oscillations and with a moderate distance between nozzle and measuring surface. The constriction is thus rather critical for the apparatus to function correctly and to give stable operation without oscillations. However, once those skilled in the art are aware of the importance of this factor, it is obvious that determination by testing does not entail particularly great difficulties. An example of suitable dimensioning is otherwise apparent from FIG. 5.

In the foregoing explanation, the effect of gravity has been entirely ignored. This is justified since the mass of the moving nozzle is low. In the described embodiment, the moving mass in both units was only 4.5 grams. This is to be compared with the forces caused by the air attaining several newtons.

Figure 6:
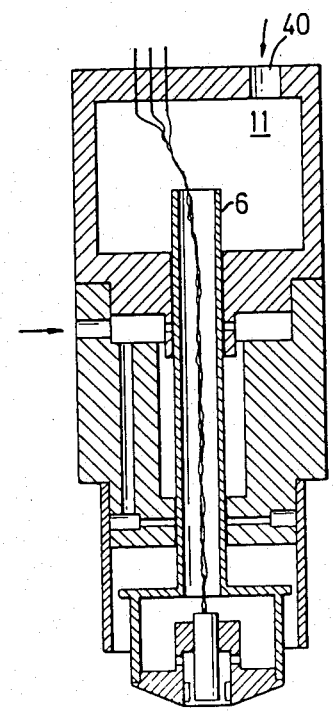
FIG. 6 illustrates an alternative embodiment.

In accordance with another embodiment illustrated in FIG. 6, and which is rather like the units illustrated in FIG. 1, the orifices in the stem 6 have been eliminated, and compressed air is supplied directly to the closed chamber 11 via an opening 40. However, air supply to the air bearings can take place in the same way as previously shown.

Figure 7:
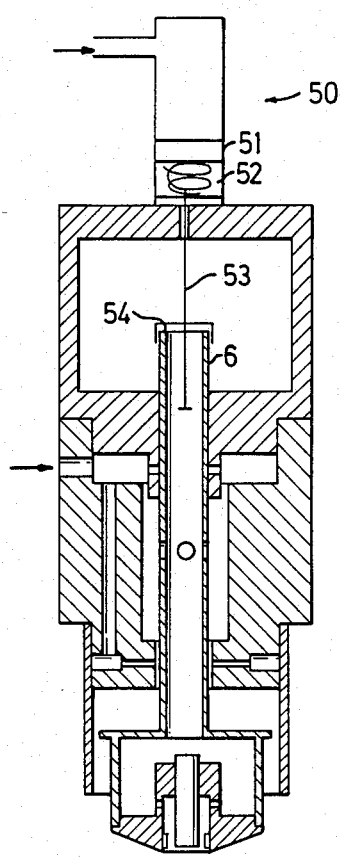
FIG. 7 illustrates a safety device.

A special safety device, illustrated in FIG. 7, is intended for the upper sensor unit, for ensuring against failure of the compressed air. It is obvious from FIG. 1 that if the compressed air to the lower unit fails, the dominant force will be gravity on the moving part, which will therefore fall down. In the case of the upper part, however, the nozzle would fall down onto the web, which would cause obvious problems if the web is moving. To eliminate this, the structure in FIG. 5 has been provided with a single-acting, spring-loaded compressed air cylinder 50, fed from the same compressed air source as presses down the piston 51 against the bias of the spring 52. Attached to the piston 51 there is a small rod 53, the lower end of which is formed with a crosspiece. The rod 53 passes through a hole in a grid washer 54 rigidly attached to the upper end of the stem 6. If the pressure fails, the rod 53 will be lifted and via the crosspiece at its end will lift the stem, thereby preventing the nozzle from falling down.

Figure 8:
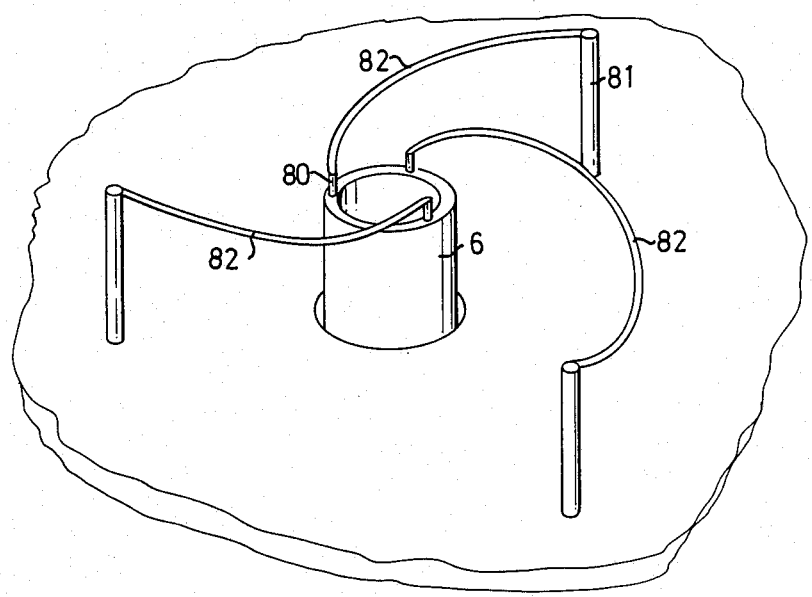
FIG. 8 illustrates an electrical connection.

In the illustrated embodiments, the electrical connection to the transducer 13 has only been illustrated schematically as twined-together thin wires 14. In practice, this is much too clumsy, and the arrangement schematically illustrated in FIG. 8 is used instead. The type of transducer used according to the above requires three connecting wires. These are terminated in the upper part of the stem 6 in the chamber 11 (FIG. 1) on the pillars 80. Inside the chamber there are the fixed connection pillars 81 which are insulated and connected to the measuring equipment. Narrow phosphor bronze strips 82 connect the pillars 80 and 81 and are arcuately curved to form three spirals. The force on the movable part will thus be minimal. Of course, the stem 6 must then not be permitted to rotate, and to prevent this there has been provided in the embodiment of FIG. 1 an axially extending pin inside the skirt 16 accommodated with play in a recess in the edge of the "mushroom" head (not shown).

While compressed air has been mentioned throughout as the fluid of choice, it is obvious that any gas may be used, according to suitability.

In the best mode embodiment known to date, it is important to note that the relationship between the surfaces is such that the effective air cushion surface is greater than the surface on which the air pressure pressing against the web is exerted, i.e., substantially the cross section of the stem. The combination of the forces will thus be such that from experience there is obtained rapid and stabilized adjustment to the web surfaces. Stability and rapidity are thus substantially better than in applicant's previous invention disclosed in Swedish Pat. No. 7900795-1. The positioning distance will also be substantially shorter, in the order of magnitude of 60–100 $\mu$m on either side. Accurate thickness measurement is thus facilitated, since the distance measured by the sensors will be smaller.

On theoretical grounds it is also obvious that, even if the restoration force is large and the moving mass small, damping must be provided. The mushroom-like form of the nozzles together with the fixed skirting in the embodiment according to FIG. 1 is quite sufficient for this purpose, and in the preferred embodiment the skirting has been provided with holes.

Unless particular means are provided for preventing turning, both the movable nozzle parts according to FIG. 1 may rotate freely about their axes. This is undesirable, at least with reference to the conductor wires 14, there being made an axially extending groove at the edge of the "mushroom", this groove accommodating with play a radial pin (not shown) arranged inside the skirting.

In the use of the apparatus, e.g., for measuring a moving web, it is suitable to take the apparatus outside the web at regular intervals and to allow the nozzles to blow against ech other. A given distance will then be set up between them, which can be measured with the aid of the sensor 13 and its opposing part, and this distance should be the same on each occasion for satisfactory operation. This distance does not, however, correspond to the case with an infinitely thin web 1, but does give good checking possibility even so.

I claim:

1. A perpendicular surface follower for measuring the thickness of a moving web, comprising two axially movable measuring heads arranged directly opposite each other in an axial direction, for passage of said web (1) between them, a source of pressurized fluid for supplying said measuring heads and ejection means for blowing said pressurized fluid towards said web for maintaining a constant distance between a respective measuring head and said web, electrical transducer means (13, 13') being arranged in said measuring heads for generating signals corresponding to the distance between said measuring heads and thereby to the thickness of said web, each of said measuring heads comprising
   (a) a housing (4) with two radially acting air bearings (7, 8) bearing a hollow stem (6) having two ends;
   (b) respective ejection means (12, 12) being attached to a first end of said stem;
   (c) means (9, 10) for supplying pressurized fluid to the interior of said stem; and
   (d) a closed first chamber (11) which is pressurizable and which receives a second end of said stem (6); and
   (e) the respective ejection means comprising a space recessed in relation to, and surrounded by, an edge (21), said space obtaining pressurized fluid from said pressurized fluid chamber via a constriction (b), said recessed space having a cross section at right angles to said axial direction having a larger area than the cross-sectional area of said stem, the fluid pressure in said closed first chamber (11) acting in an outwardly urging direction.

2. A pneumatic surface follower for measuring the thickness of a moving web, according to claim 1, wherein said means for supplying pressurized fluid to the interior of the stem (6) comprise a second pressurizable chamber (9) traversed by said stem (6), in the wall of said stem having at least one orifice (10) in its portion traversing said second chamber (9).

3. A pneumatic surface follower for measuring the thickness of a moving web, according to claim 1, wherein said means for supplying pressurized fluid to the interior of said stem (6) comprise a pressurized fluid inlet (40) to said first chamber (11).

4. A pneumatic surface follower for measuring the thickness of a moving web, according to claim 1, wherein said constriction (b) is arranged as a narrow annular gap between a cylindrical electrical transducer means (13, 13') and an orifice in said recessed space.

* * * * *